(12) United States Patent  
Sutskever et al.

(10) Patent No.: US 10,380,482 B2  
(45) Date of Patent: Aug. 13, 2019

(54) TRAINING NEURAL NETWORKS ON PARTITIONED TRAINING DATA

(71) Applicant: Google LLC, Mountain View, CA (US)

(72) Inventors: Ilya Sutskever, Mountain View, CA (US); Wojciech Zaremba, Kluczbork (PL)

(73) Assignee: Google LLC, Mountain View, CA (US)

( * ) Notice: Subject to any disclaimer, the term of this patent is extended or adjusted under 35 U.S.C. 154(b) by 673 days.

(21) Appl. No.: 14/877,071

(22) Filed: Oct. 7, 2015

(65) Prior Publication Data

US 2016/0098632 A1   Apr. 7, 2016

Related U.S. Application Data

(60) Provisional application No. 62/061,035, filed on Oct. 7, 2014.

(51) Int. Cl.
| | | |
|---|---|---|
| *G06N 3/08* | (2006.01) | |
| *G06N 3/04* | (2006.01) | |
| *G06N 3/10* | (2006.01) | |

(52) U.S. Cl.  
CPC ............. *G06N 3/08* (2013.01); *G06N 3/0445* (2013.01); *G06N 3/10* (2013.01)

(58) Field of Classification Search  
CPC .......... G06N 3/08; G06N 3/0445; G06N 3/10; G06N 3/0454; G06N 99/005  
See application file for complete search history.

(56) References Cited

U.S. PATENT DOCUMENTS

| | | | |
|---|---|---|---|
| 6,456,991 B1 | 9/2002 | Srinivasa et al. | |
| 6,651,244 B1* | 11/2003 | Smith | G06F 8/75 |
| | | | 714/38.1 |
| 2016/0034812 A1* | 2/2016 | Gibson | G06N 3/08 |
| | | | 706/25 |

(Continued)

OTHER PUBLICATIONS

Yoshua Bengio et al., Curriculum Learning, 2009, Proceedings of the 26th International Conference on Machine Learning, pp. 41-48.*

(Continued)

*Primary Examiner* — Kamran Afshar  
*Assistant Examiner* — Brent Johnston Hoover  
(74) *Attorney, Agent, or Firm* — Fish & Richardson P.C.

(57) ABSTRACT

Methods, systems, and apparatus, including computer programs encoded on computer storage media, for training a neural network. One of the methods includes obtaining partitioned training data for the neural network, wherein the partitioned training data comprises a plurality of training items each of which is assigned to a respective one of a plurality of partitions, wherein each partition is associated with a respective difficulty level; and training the neural network on each of the partitions in a sequence from a partition associated with an easiest difficulty level to a partition associated with a hardest difficulty level, wherein, for each of the partitions, training the neural network comprises: training the neural network on a sequence of training items that includes training items selected from the training items in the partition interspersed with training items selected from the training items in all of the partitions.

19 Claims, 3 Drawing Sheets

(56) References Cited

U.S. PATENT DOCUMENTS

2017/0147920 A1* 5/2017 Huo .................. G06N 3/08

OTHER PUBLICATIONS

Shi et al., "K-Component Recurrent Neural Network Language Models Using Curriculum Learning", Dec. 8, 2013, 2013 IEEE Workshop on Automatic Speech Recognition and Understanding, pp. 1-6 (Year: 2013).*

Smith et al., "An Extensive Evaluation of Filtering Misclassified Instances in Supervised Classification Tasks", Dec. 17, 2013, in CoRR, pp. 1-29 (Year: 2013).*

International Search Report and Written Opinion in International Application No. PCT/US2015/054188, dated Jan. 21, 2016, 13 pages.

Shi et al., "K-component recurrent neural network language models using curriculum learning," 2013 IEEE Workshop on Automatic Speech Recognition and Understanding, IEEE, Dec. 2013, pp. 1-6.

Shi et al., "Recurrent neural network language model adaptation with curriculum learning," Computer Speech and Language, 33(1):136-154, Dec. 2014.

Zaremba et al., "Learning to Execute," arXiv:1410.4615 [cs.NE], Oct. 2014, 8 pages.

Bengio et al., "Curriculum Learning," Proceedings of the 26th International Conference on Machine Learning, pp. 41-48, 2009.

Kumar et al., "Self-paced learning for latent variable models," In Advances in Neural Information Processing Systems, pp. 1189-1197, 2010.

Lee and Graunian, "Learning the easy things first: Self-paced visual category discovery," In Computer Vision and Pattern Recognition (CVPR), 2011 IEEE Conference on, pp. 1721-1728, Jun. 2011.

Sutskever et al., "Sequence to sequence learning with neural networks," arXiv preprint arXiv:1409.3215, pp. 1-9, 2014.

International Preliminary Report on Patentability issued in International Application No. PCT/US2015/054188, dated Apr. 20, 2017, 8 pages.

* cited by examiner

TRAINING NEURAL NETWORKS ON PARTITIONED TRAINING DATA

CROSS-REFERENCE TO RELATED APPLICATION

This application claims priority to U.S. Provisional Application No. 62/061,035, filed on Oct. 7, 2014. The disclosure of the prior application is considered part of and is incorporated by reference in the disclosure of this application.

BACKGROUND

This specification relates to training neural networks.

Neural networks are machine learning models that employ one or more layers of models to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

In general, one innovative aspect of the subject matter described in this specification can be embodied in methods that include the actions of obtaining partitioned training data for the neural network, wherein the partitioned training data comprises a plurality of training items each of which is assigned to a respective one of a plurality of partitions, wherein each partition is associated with a respective difficulty level; and training the neural network on each of the partitions in a sequence from a partition associated with an easiest difficulty level to a partition associated with a hardest difficulty level, wherein, for each of the partitions, training the neural network comprises: training the neural network on a sequence of training items that includes training items selected from the training items in the partition interspersed with training items selected from the training items in all of the partitions.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. By training a neural network on training data that has been partitioned by difficulty level in sequence starting with the easiest partition and ending with the hardest partition, the performance of the neural network when trained can be improved. In particular, for a given partition, by training the neural network on a sequence of training items that includes training items selected from training items in the partition and training items selected from training items in all of the partitions, the performance of the neural network when trained can be improved relative to training the neural network on a sequence that includes only training items from the partition or only training items selected from all of the partitions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
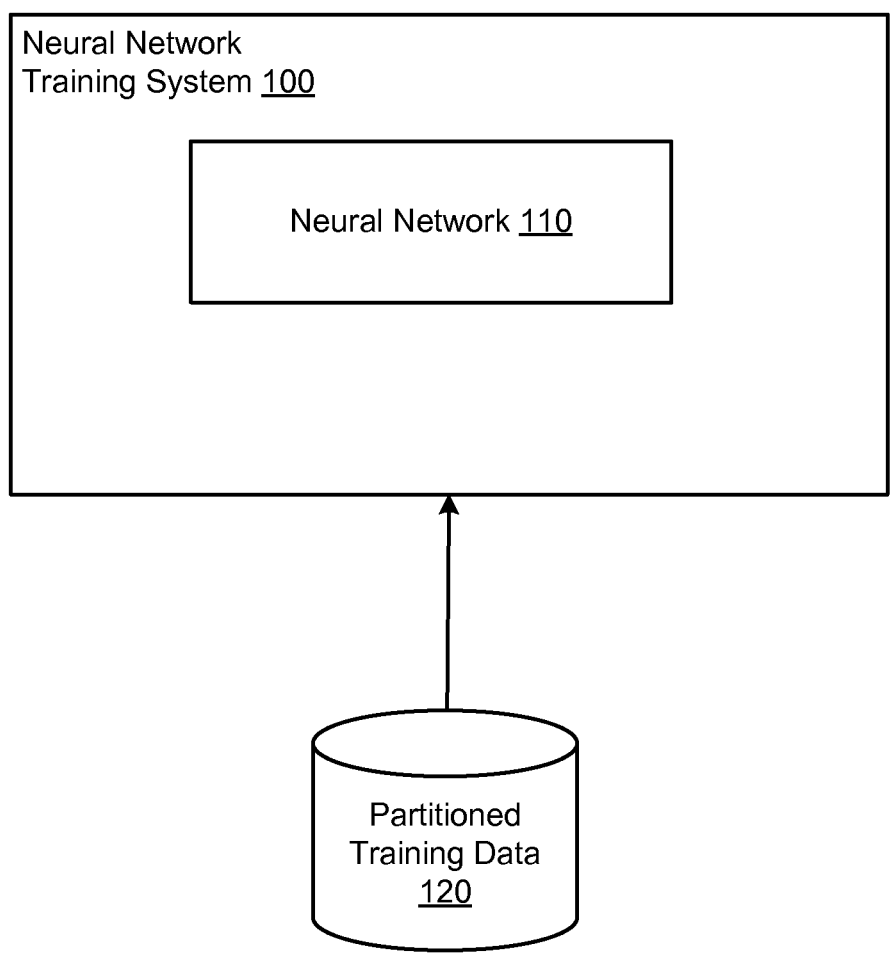
FIG. 1 shows an example neural network training system.

FIG. 1 shows an example neural network training system 100. The neural network training system 100 is an example of a system implemented as computer programs on one or more computers in one or more locations, in which the systems, components, and techniques described below can be implemented.

The neural network training system 100 trains a neural network 110 on training items from a partitioned training data repository 120 to determine trained values of the parameters of the neural network 110 from initial values of the parameters. The neural network 110 can be a feedforward deep neural network, e.g., a convolutional neural network, or a recurrent neural network, e.g., a long short term (LSTM) neural network.

The neural network 110 can be configured to receive any kind of digital data input and to generate any kind of score or classification output based on the input.

For example, in some implementations, the neural network 110 is a recurrent neural network that is configured to receive the code of a computer program and to predict the output of the computer program.

As another example, if the inputs to the neural network 110 are images or features that have been extracted from images, the output generated by the neural network 110 for a given image may be scores for each of a set of object categories, with each score representing an estimated likelihood that the image contains an image of an object belonging to the category.

As another example, if the inputs to the neural network 110 are Internet resources (e.g., web pages), documents, or portions of documents or features extracted from Internet resources, documents, or portions of documents, the output generated by the neural network 110 for a given Internet resource, document, or portion of a document may be a score for each of a set of topics, with each score representing an estimated likelihood that the Internet resource, document, or document portion is about the topic.

As another example, if the inputs to the neural network 110 are features of an impression context for a particular advertisement, the output generated by the neural network 110 may be a score that represents an estimated likelihood that the particular advertisement will be clicked on.

As another example, if the inputs to the neural network 110 are features of a personalized recommendation for a user, e.g., features characterizing the context for the recommendation, e.g., features characterizing previous actions taken by the user, the output generated by the neural network 110 may be a score for each of a set of content items, with each score representing an estimated likelihood that the user will respond favorably to being recommended the content item.

As another example, if the input to the neural network 110 is a sequence of text in one language, the output generated by the neural network 110 may be a score for each of a set of pieces of text in another language, with each score representing an estimated likelihood that the piece of text in the other language is a proper translation of the input text into the other language.

As another example, if the input to the neural network 110 is a sequence representing a spoken utterance, the output generated by the neural network 110 may be a score for each of a set of pieces of text, each score representing an estimated likelihood that the piece of text is the correct transcript for the utterance.

The training items in the partitioned training data repository 120 are partitioned into multiple partitions such that each training item in the partitioned training data repository 120 is assigned to a respective one of the multiple partitions. Generally, each training item is an input of the type that the neural network 110 is configured to receive. In implementations where the neural network 110 is trained in a supervised manner, each training input is associated with a respective known output, i.e., the output that should be generated by the neural network 110 by processing the training item.

Each of the partitions is associated with a respective difficulty level. Thus, each training item in a given partition is a training item that has been assigned the difficulty level that is associated with the partition. Generally, generating an output that matches or closely approximates the known output for the training item is a more difficult task for the neural network 110 for a training item that has been assigned a harder difficulty level than for a training item that has been assigned a relatively easier difficulty level, e.g., because the training item that has been assigned the harder difficulty level is more complex than the training item that has been assigned the relatively easier difficulty level.

In some implementations, the training items are partitioned and the difficulty levels are assigned by an external system or by a user, e.g., a system administrator. In some other implementations, the neural network training system 100 partitions the training items and assigns the difficulty levels. For example, in implementations where the input to the neural network 110 is a piece of computer program code, the neural network training system 100 can determine a difficulty level of a given piece of code based on lengths of values, e.g., numeric values, in the code, based on levels of nesting present in the code, or on both.

Generally, the neural network training system 100 trains the neural network 110 on all of the partitions in the partitioned training data repository 120 in a sequence that is ordered by increasing difficulty level, starting from the partition associated with the easiest difficulty level and ending with the partition associated with the hardest difficulty level. That is, the neural network training system 100 trains the neural network 110 first on the easiest partition in the sequence, then on the second partition in the sequence, then on the third partition in the sequence, and so on. To train the neural network 110 on a given partition, the neural network training system 100 trains the neural network 110 on a sequence of training inputs that includes training inputs selected from the given partition and training inputs selected from all of the partitions. Training the neural network 110 on a given partition is described in more detail below with reference to FIG. 3.

Figure 2:
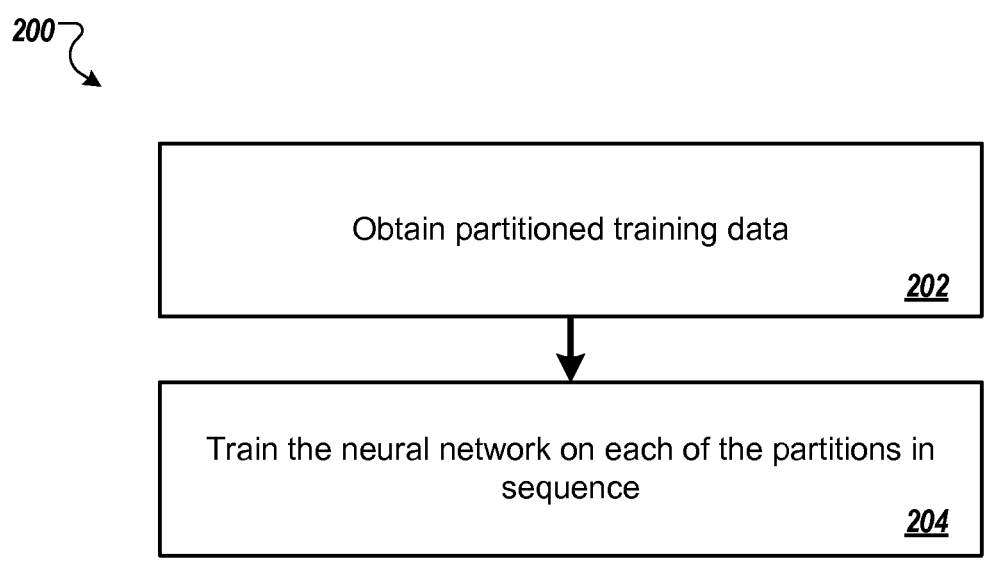
FIG. 2 is a flow diagram of an example process for training a neural network on partitioned training data.

FIG. 2 is a flow diagram of an example process 200 for training a neural network on partitioned training data. For convenience, the process 200 will be described as being performed by a system of one or more computers located in one or more locations. For example, a neural network training system, e.g., the neural network training system 100 of FIG. 1, appropriately programmed, can perform the process 200.

The system obtains partitioned training data for the neural network, e.g., from the partitioned training data repository 120 of FIG. 1 (step 202). The partitioned training data includes multiple training items, with each training item being assigned to a respective partition from a set of partitions. Additionally, each partition is associated with a respective difficulty level.

The system trains the neural network on each of the partitions in sequence from a partition associated with the easiest difficulty level to the partition associated with the hardest difficulty level (step 204). Generally, to train the neural network on a partition, the system trains the neural network on a sequence of training items that includes training items selected from the training items in the partition interspersed with training items selected from the training items in all of the partitions. Training the neural network on a given partition is described in more detail below with reference to FIG. 3.

Figure 3:
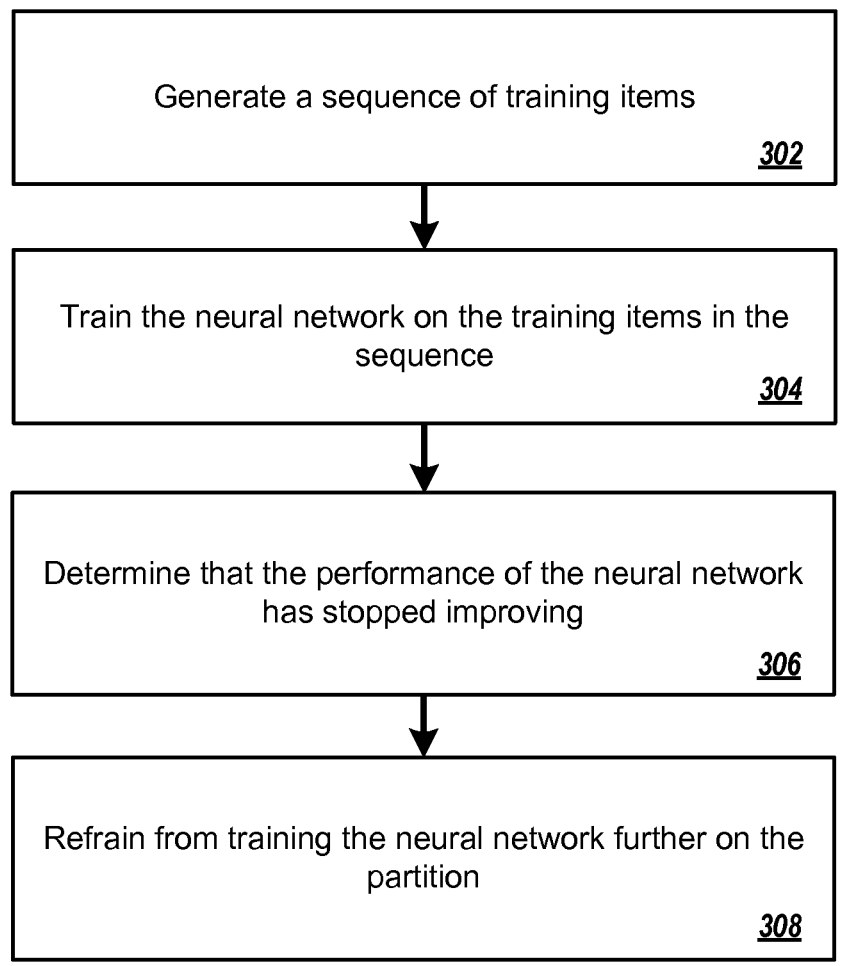
FIG. 3 is a flow diagram of an example process for training a neural network on a partition of training data.

FIG. 3 is a flow diagram of an example process 300 for training a neural network on a partition of training data. For convenience, the process 300 will be described as being performed by a system of one or more computers located in one or more locations. For example, a neural network training system, e.g., the neural network training system 100 of FIG. 1, appropriately programmed, can perform the process 300.

The system generates a sequence of training items for the partition (step 302). In particular, the system generates a sequence that includes training items selected from the partition and training items selected from all of the partitions. For example, the sequence can include training items selected from the training items in all of the partitions interspersed at predetermined intervals in the sequence, e.g., at every fourth training item, every fifth training item, or every tenth training item, with the other training items being selected from the current partition. Generally, however, the training items selected from the current partition make up the majority of the training items in the sequence.

The system selects the training items in the sequence that are selected from the current partition by randomly selecting a training item from the current partition. In some implementations, the system selects the training items in the sequence that are selected from all of the partitions by randomly selecting a training item from among the training items in the partitioned training data. In some other implementations, the system selects these training items by randomly selecting a partition, and then randomly selecting a training item from the training items in the randomly selected partition.

The system trains the neural network on the training items in the sequence (step 304). That is, the system trains the neural network on the training items in the sequence in the order in which the training items appear in the sequence using conventional machine learning training techniques to adjust the values of the parameters of the neural network.

For example, if the neural network is a feedforward neural network, the system can train the neural network on a given training item using a conventional stochastic gradient descent with backpropagation training technique. That is, the system can process the training item using the neural network to determine a neural network output for the training item, determine an error between the neural network output and the known output for the training item, and then use the error to adjust the values of the parameters of the neural network using a conventional stochastic gradient descent with backpropagation training technique.

As another example, if the neural network is a recurrent neural network, the system can train the neural network on a given training item using a conventional backpropagation through time training technique.

While training the neural network on the training items in the sequence, the system determines that the performance of the neural network has stopped improving (step 306) and, in response, refrains from training the neural network further on the partition, i.e., even if the neural network has not yet been trained on all of the training items in the sequence (step 308).

The system determines that the performance of the neural network has stopped improving when the change, e.g., a reduction, in an error measure between the known outputs for the training items in the sequence for the partition and the neural network outputs generated by the neural network for the training items becomes lower than a threshold value. The system can measure this error using any of a variety of conventional neural network training error measures.

If the partition is not the last partition in the sequence of partitions, after determining that the performance of the neural network has stopped improving, the system begins training the neural network on the next partition in the sequence of partitions. If the partition is the last partition in the sequence, the system can terminate the training of the neural network. If the performance of the neural network never stops improving while training the neural network on the partition, the system trains the neural network on all of the training items in the sequence for the partition.

In some implementations, rather than refraining from training further on the partition in response to determining whether or not the performance has stopped improving, the system trains the neural network on the partition until the neural network has been trained on the last training item in the sequence for the partition.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training a neural network, the method comprising:
    obtaining, by one or more computers, partitioned training data for use in training the neural network, wherein the partitioned training data comprises a plurality of training items each of which is assigned to a respective one of a plurality of partitions;
    obtaining, by the one or more computers, an input specifying a difficulty order for the partitions; and
    training, by the one or more computers, the neural network on each of the partitions according to the difficulty order and starting from a first partition in the difficulty order and ending with a last partition in the difficulty order, wherein, for each particular partition of the plurality of partitions, training the neural network comprises:
    generating a sequence of training items for the particular partition, comprising:
        selecting a plurality of training items from among all of the training items in all of the plurality of partitions, and
        generating a sequence of training items that includes the training items selected from among all of the training items in all of the plurality of positions inserted between training items selected only from the plurality of training items in the particular partition; and
    training the neural network on the sequence of training items for the partition.

2. The method of claim 1, wherein the training items selected from the training items in all of the partitions are interspersed at predetermined regular intervals in the sequence for the particular partition.

3. The method of claim 1, wherein the training items selected from the training items in the particular partition are a majority of the training items in the sequence for the particular partition.

4. The method of claim 1, wherein selecting the plurality of training items from among all of the training items in all of the plurality of partitions comprises, for each selected training item:
    randomly selecting a partition from the plurality of partitions; and
    randomly selecting the training item from among the training items in the randomly selected partition.

5. The method of claim 1, wherein selecting the plurality of training items from among all of the training items in all of the plurality of partitions comprises, for each selected training item selecting the training item randomly from among the plurality of training items.

6. The method of claim 1, wherein the training items selected only from the plurality of training items in the particular partition comprises are selected randomly from the training items in the particular partition.

7. The method of claim 1, wherein, for each particular partition of the plurality of partitions, training the neural network further comprises:
    while training the neural network on the particular partition, determining whether a performance of the neural network has stopped improving; and
    refraining from training the neural network further on the particular partition in response to determining that the performance of the neural network has stopped improving.

8. The method of claim 7, wherein determining that the performance of the neural network has stopped improving comprises determining that a reduction in an error measure for the training has become lower than a threshold.

9. The method of claim 1, wherein the neural network is a recurrent neural network.

10. The method of claim 9, wherein the recurrent neural network is a long short term (LSTM) neural network.

11. The method of claim 9, wherein each of the training items is a sequence of code from a respective computer program and wherein the recurrent neural network is configured to process the sequence of code and output a predicted output of the computer program.

12. The method of claim 11, wherein the difficulty order is based at least in part on lengths of values that appear in the code.

13. The method of claim 11, wherein difficulty order is based at least in part on levels of nesting that appear in the code.

14. A system comprising one or more computers and one or more storage devices storing instructions that when executed by one or more computers cause the one or more computers to perform operations comprising:
    obtaining partitioned training data for use in training the neural network, wherein the partitioned training data comprises a plurality of training items each of which is assigned to a respective one of a plurality of partitions;
    obtaining an input specifying a difficulty order for the partitions; and
    training the neural network on each of the partitions according to the difficulty order and starting from a first partition in the difficulty order and ending with a last partition in the difficulty order, wherein, for each particular partition of the plurality of partitions, training the neural network comprises:
    generating a sequence of training items for the particular partition, comprising:
        selecting a plurality of training items from among all of the training items in all of the plurality of partitions, and
        generating a sequence of training items that includes the training items selected from among all of the training items in all of the plurality of positions inserted between training items selected only from the plurality of training items in the particular partition; and
    training the neural network on the sequence of training items for the partition.

15. The system of claim 14, wherein the training items selected from the training items in all of the partitions are interspersed at predetermined regular intervals in the sequence for the particular partition.

16. The system of claim 14, wherein the training items selected from the training items in the particular partition are a majority of the training items in the sequence for the particular partition.

17. The system of claim 14, wherein selecting the plurality of training items from among all of the training items in all of the plurality of partitions comprises, for each selected training item selecting the training item randomly from among the plurality of training items.

18. The system of claim 14, wherein, for each particular partition of the plurality of partitions, training the neural network further comprises:
    while training the neural network on the particular partition, determining whether a performance of the neural network has stopped improving; and
    refraining from training the neural network further on the particular partition in response to determining that the performance of the neural network has stopped improving.

19. A computer program product encoded on one or more non-transitory computer readable storage media, the computer program product comprising instructions that when executed by one or more computers cause the one or more computers to perform operations comprising:
    obtaining partitioned training data for use in training the neural network, wherein the partitioned training data comprises a plurality of training items each of which is assigned to a respective one of a plurality of partitions;
    obtaining an input specifying a difficulty order for the partitions; and
    training the neural network on each of the partitions according to the difficulty order and starting from a first partition in the difficulty order and ending with a last partition in the difficulty order, wherein, for each particular partition of the plurality of partitions, training the neural network comprises:
    generating a sequence of training items for the particular partition, comprising:
        selecting a plurality of training items from among all of the training items in all of the plurality of partitions, and
        generating a sequence of training items that includes the training items selected from among all of the training items in all of the plurality of positions inserted between training items selected only from the plurality of training items in the particular partition; and training the neural network on the sequence of training items for the partition.

* * * * *

UNITED STATES PATENT AND TRADEMARK OFFICE
CERTIFICATE OF CORRECTION

PATENT NO. : 10,380,482 B2
APPLICATION NO. : 14/877071
DATED : August 13, 2019
INVENTOR(S) : Sutskever et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 727 days.

Signed and Sealed this
Nineteenth Day of May, 2020

Andrei Iancu
*Director of the United States Patent and Trademark Office*